United States Patent
Medhi

(10) Patent No.: US 9,208,050 B2
(45) Date of Patent: Dec. 8, 2015

(54) METHODS AND APPARATUS TO MANAGE SYSTEM PERFORMANCE INFORMATION

(75) Inventor: Goranka Medhi, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 835 days.

(21) Appl. No.: 12/885,587

(22) Filed: Sep. 20, 2010

(65) Prior Publication Data

US 2012/0023429 A1 Jan. 26, 2012

(30) Foreign Application Priority Data

Jul. 21, 2010 (IN) ............................ 2087/CHE/2010

(51) Int. Cl.
G06F 3/048 (2013.01)
G06F 11/32 (2006.01)
G06F 3/0484 (2013.01)
G06F 11/34 (2006.01)

(52) U.S. Cl.
CPC .......... *G06F 11/323* (2013.01); *G06F 3/04842* (2013.01); *G06F 11/3409* (2013.01)

(58) Field of Classification Search
CPC  G06F 11/323; G06F 11/3409; G06F 3/04842
USPC ........................................................ 715/772
See application file for complete search history.

(56) References Cited

U.S. PATENT DOCUMENTS

| | | | | |
|---|---|---|---|---|
| 6,356,256 B1 * | 3/2002 | Leftwich | ........................ | 345/157 |
| 6,898,556 B2 * | 5/2005 | Smocha et al. | ................ | 702/186 |
| 6,956,593 B1 * | 10/2005 | Gupta et al. | ................... | 715/751 |
| 6,975,963 B2 * | 12/2005 | Hamilton et al. | .............. | 702/182 |
| 7,110,756 B2 * | 9/2006 | Diener | ........................... | 455/423 |
| 7,134,093 B2 * | 11/2006 | Etgen et al. | ..................... | 715/786 |
| 7,348,981 B1 * | 3/2008 | Buck | ........................... | 345/440.2 |
| 7,460,837 B2 * | 12/2008 | Diener | ......................... | 455/67.7 |
| 8,099,674 B2 * | 1/2012 | Mackinlay et al. | ............ | 715/764 |
| 8,185,840 B2 * | 5/2012 | Santori et al. | .................. | 715/771 |
| 2004/0041838 A1 * | 3/2004 | Adusumilli et al. | ........... | 345/772 |

(Continued)

OTHER PUBLICATIONS

Bosch Jr., Robert P., "Using Visualization to Understand the Behavior of Computer Systems," Aug. 2001, 100 pages.

(Continued)

*Primary Examiner* — Jennifer To
*Assistant Examiner* — Li Sun
(74) *Attorney, Agent, or Firm* — Hanley, Flight & Zimmerman, LLC

(57) ABSTRACT

Example methods, apparatus, and articles of manufacture to manage system, computer, application, service, and/or network performance information are disclosed. A disclosed example apparatus includes a data interface, a display interface, a user control interface, and a temporal scale handler. The data interface is responsive to a user selection of a first data set identifier associated with a first system performance metric, to retrieve a first data set corresponding to the first data set identifier. The display interface is to display a first plot corresponding to the first data set in a time navigator view of a graphical user interface host. The user control interface is to detect a user-selected time-range portion of the first plot in the time navigator. The temporal scale handler is to generate replicated time-range portions based on the user-selected time-range portion. The display interface is to display the replicated time-range portions in the time navigator at periodic intervals relative to the user-selected time-range portion.

15 Claims, 14 Drawing Sheets

(56) References Cited

U.S. PATENT DOCUMENTS

| | | | | |
|---|---|---|---|---|
| 2006/0156259 | A1* | 7/2006 | Wagner et al. | 715/963 |
| 2006/0189330 | A1* | 8/2006 | Nelson et al. | 455/457 |
| 2009/0125825 | A1* | 5/2009 | Rye et al. | 715/764 |
| 2009/0144568 | A1* | 6/2009 | Fung | 713/300 |
| 2012/0117453 | A1* | 5/2012 | Mackinlay et al. | 715/212 |

OTHER PUBLICATIONS

Gunther, Neil J. et al., "Seeing It All At Once With Barry," Sep. 27, 2007, 16 pages.

Gunther, Neil J., "Millennium Performance Problem 1: Performance Visualization," May 2005, retrieved from internet: http://www.cmg.org/measureit/issues/mit22/m_22_1.html, 8 pages.

McMahon, Peg et al., "Death to Dashboards: Alarming, Performance Management Based on Variance, System Prioritization and Other Thoughts on Data Visualization," 2007, 5 pages.

Medhi, Goranka, "An Interactive System to Monitor and Graph Performance Data from Multi-type Data Sources in an Enterprise System," Apr. 2010, 2 pages.

Performance Graph Software (1 of 2), retrieved from internet: http://www.filebuzz.com/findsoftware/Performance_Graph_Software/index.html, on Jun. 25, 2010, 4 pages.

Performance Graph Software (2 of 2), retrieved from internet http://www.filebuzz.com/findsoftware/Performance_Graph_Software/2.html, on Jun. 25, 2010, 4 pages.

HP GlancePlus software Data Sheet, 4AA1-1027ENW, Apr. 2007, 4 pages.

HP SiteScope Software Data Sheet, 4AA1-6157ENW, Oct. 2007, Updated Jun. 2010, Rev. 4, 4 pages.

* cited by examiner

MAGNIFICATION VIEW IN A SEPARATE GRAPH WINDOW

MOVE SELECT DATA SETS BETWEEN DIFFERENT GRAPH WINDOWS

COMBINE DATA SETS FROM DIFFERENT DATA SOURCES

COMBINE MULTI-INSTANCE DATA SETS FOR SAME METRIC

LAUNCH REAL TIME VIEW FROM STORED DATA VIEW

METHODS AND APPARATUS TO MANAGE SYSTEM PERFORMANCE INFORMATION

RELATED APPLICATIONS

Benefit is claimed under 35 U.S.C. 119(a)-(d) to Foreign application Serial No. 2087/CHE/2010 entitled "METHODS AND APPARATUS TO MANAGE SYSTEM PERFORMANCE INFORMATION" by Hewlett-Packard Development Company, L.P., filed on 21 Jul. 2010, in INDIA which is herein incorporated in its entirety by reference for all purposes.

BACKGROUND

Computer and network performance analysis systems enable users to view performance information in graphical representations. Such systems may be used to analyze performance of a single computer, a small network, or large enterprise networks spanning a campus or over several geographic regions. In some instances, information technology (IT) management solutions collect large amounts of data across hundreds and thousands of servers and applications in complex IT environments. The collected data can be stored for subsequent retrieval and analysis by IT personnel. Traditional performance analysis systems may be used to view different performance metrics in isolation. That is, at any instance in time, such systems can display to an end user a single graphic representation of a corresponding single metric.

DETAILED DESCRIPTION

Figure 1:
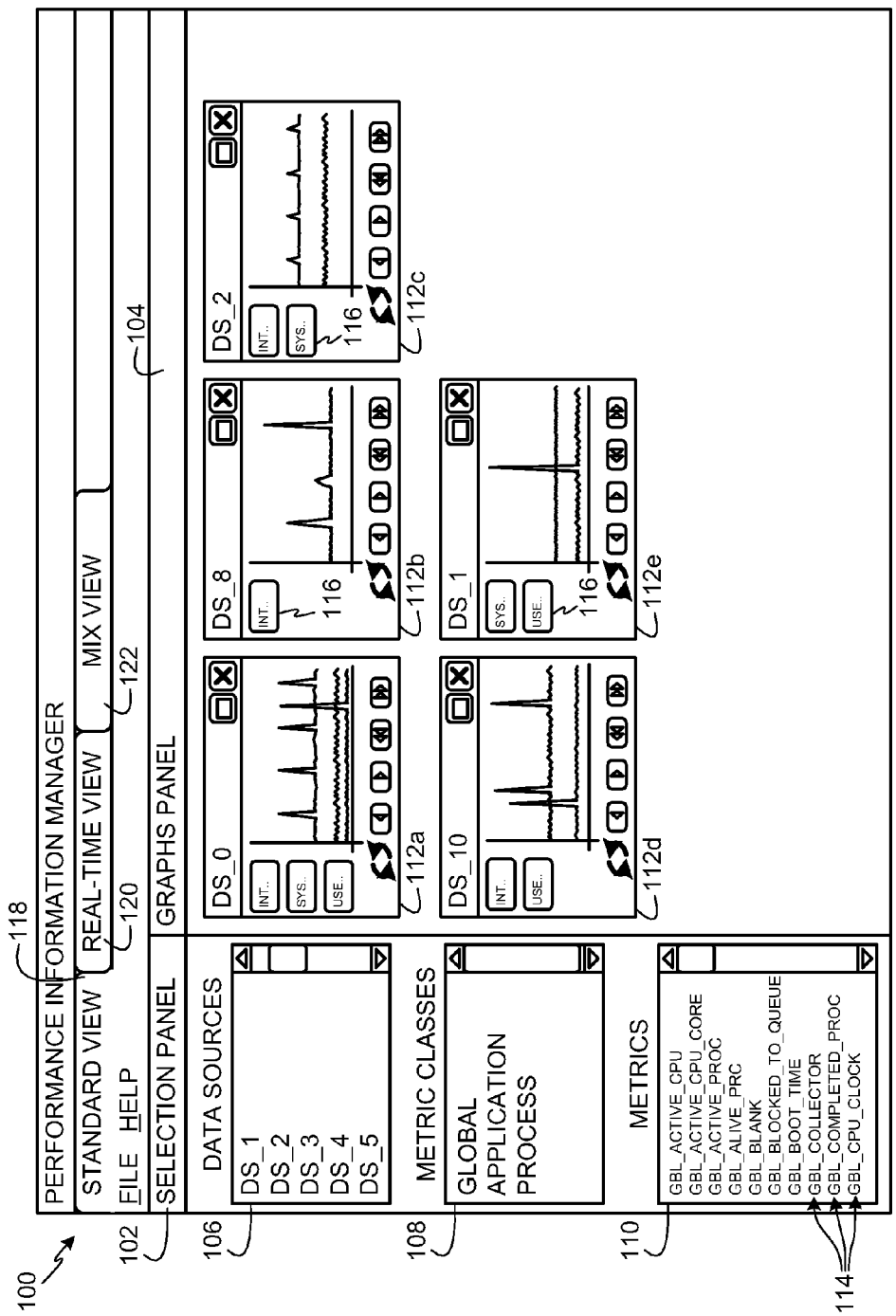
FIG. 1 depicts an example graphical user interface having data sets in graphical representation from different data sources simultaneously displayed thereon in different graph views.

Example methods, apparatus, and articles of manufacture described herein can be used to implement performance graphing and diagnostic tool to view and manage performance information associated with different processor systems and computer networks. The example methods, apparatus, and articles of manufacture described herein may be advantageously used to perform in-depth analyses of computer performance and computer performance problems. Performance analyzers (e.g., users) often have extensive knowledge about the performance metrics that various known performance collectors (e.g., HP Performance Agent, SiteScope® software, Business Process Monitor (BPM) software) gather. The methods, apparatus, and articles of manufacture described herein can be used to layout and display computer, system, application, service, and/or network performance information to facilitate analyses of the same by such performance analyzers based on their knowledge of performance metrics. The example methods, apparatus, and articles of manufacture layout information and allow user control thereof in a more useful style that facilitates relatively greater human perception and more visual understanding than known performance analysis tools.

Example methods, apparatus, and articles of manufacture described herein enable users to access various performance metrics via a single user interface console or host window and relatively quickly graph the performance metrics in different combinations to facilitate identifying issues or problem patterns in system performance. Some such example methods, apparatus, and articles of manufacture enable performance graphing and analysis based on comparative and relative values rather than and/or in addition to absolute values by showing data sets from different metrics in graphical representation relative to one another. Such relative displaying of data sets also enables comparing performance data in the context of business events or other activities that may affect computer and/or network performance.

Example methods, apparatus, and articles of manufacture described herein provide relatively better visualization of performance data than known performance analysis systems by employing a multi-system graphing console or dashboard where performance metrics from different sources can be quickly dragged (e.g., using user-interface drag events) into the console to dynamically create graphs of selected performance metrics data sets. In addition, the multi-system graphing console or dashboard enables users to relatively easily move metric data sets into a graph area and between different graph views to facilitate quick relative comparisons between different metrics of related systems and applications.

In addition, the multi-system graphing console or dashboard further enables simultaneous graphing of previously collected performance data, real-time performance data, and/or near-real-time performance data to further facilitate relative comparisons between historical and real-time system performance by allowing switching contexts between historical, real-time, and near-real-time data relatively quickly.

Example methods, apparatus, and articles of manufacture described herein facilitate diagnosing performance problems using calendar-based time-line analyses. In this manner, information technology (IT) infrastructures more closely linked to business processes and activities can be more effectively analyzed for performance problems related to such business processes and activities by graphically showing metric data sets in association with calendar times during which business events or activities may have occurred. For example, performance data may be analyzed at periodic intervals such as every Monday morning when there is peak load on a server portal or every quarter end when specific business events impact the IT infrastructure performance. To enable such analyses, some example methods, apparatus, and articles of manufacture use calendar contexts like "weeks in a month", "months in a year", "hours in a day", etc. Such example implementations make it relatively easier to relate performance data to recurring business events or activities.

Turning now to FIG. 1, an example graphical user interface 100 is shown simultaneously displaying data sets in graphical representation from different data sources. In particular, the example graphical user interface 100 is a graphical user interface host or dashboard having a selection panel area 102, and a graphs panel area 104. In the selection panel area 102, the graphical user interface 100 displays a data sources box 106, a metric classes box 108, and a metric data sets box 110. In the graphs panel area 104, the graphical user interface 100 displays graph views 112a-e. In the illustrated example, data plots in the graph views 112a-e correspond to respective metric data sets shown in the metric data sets box 110, and each of the graph views 112a-e corresponds to a respective data source shown in the data sources box 106. Each data source listed in the data sources box 106 includes a plurality of metric data sets that can be selected by a user. For example, when a user selects a data source, data set identifiers of respective metric data sets are displayed in the metric data sets box 110 for selection by a user. A user can then cause the graphical user interface 100 to display graphical representations (e.g., data plots in the graph views 112a-e) of metric data sets by selecting and dragging data set identifiers (e.g., one or more of data set identifiers 114) from the metric data sets box 110 to the graphs panel area 104. In the illustrated example, after user-interface selection and dragging events, selected data set identifiers are shown as labels (e.g., data set identifier labels 116) in respective ones of the graph views 112a-e to which a user moved the data set identifiers. In addition, each data set plot in each of the graph views 112a-e may be individually removed from its graph view independent of the other data set plots by, for example, selecting the data set plot to be removed in the graph view and selecting a REMOVE menu command (not shown).

In the illustrated example, the data set identifiers in the metric data sets box 110 include GBL_ACTIVE_CPU (percentage of time that a processor is active to service global processes), GBL_ACTIVE_CPU_CORE (percentage of time that a processor core is active to service global processes), GBL_ACTIVE_PROC (quantity of active global processes), GBL_ALIVE_PRC (quantity of global processes that are alive), GBL_BLANK, GBL_BLOCKED_TO_ QUEUE (quantity of global processes that are blocked from a thread queue), GBL_BOOT_TIME (quantity of time spent by global processes to boot a system), GBL_COLLECTOR (quantity of time spent executing a collector process), GBL_COMPLETED_PROC (quantity of completed global processes), and GBL_CPU_CLOCK (a processor cycle count).

In the illustrated example, the metric classes box 108 shows labels or identifiers for different types of metrics classes for which data sets can be made available in the metric data sets box 110. In the illustrated example, the different metrics classes include a global metrics class, an application metrics class and a process metrics class. The global metrics class type is associated with metrics collected for overall computer operation, the application metrics class type is associated with metrics collected for specific application instances executing on computers, and the process metrics class type is associated with metrics collected for specific processes that are executed for applications.

In the illustrated example, the graphical user interface 100 is provided with a standard view tab 118, a real-time view tab 120, and a mix view tab 122. When the standard view tab 118 is selected, the graphs panel area 104 displays graphical representations of previously collected data sets (e.g., historical performance data). When the real-time view tab 120 is selected, the graphs panel area 104 displays graphical representations of real-time monitoring (RTM) data and/or near-real time data. When the mix view tab 122 is selected, the graphs panel area 104 displays graphical representations of historical performance data and real-time data (or near-real-time data). In the example implementations described herein, near-real-time data is data that has been collected within a particular duration relative to a present time. For example, near-real-time data may have delays of seconds, minute(s), or any other time which would nonetheless make it relevant as near-real-time data. Although FIG. 1 shows the standard view tab, 118, the real-time view tab 120, and the mix view tab 122, in other example implementations, the graphical user interface 100 may be implemented without such tabs and/or may simultaneously display graphical representations of historical performance data, real-time performance data, and/or near-real-time performance data in the graphs panel view 104.

Figure 2:
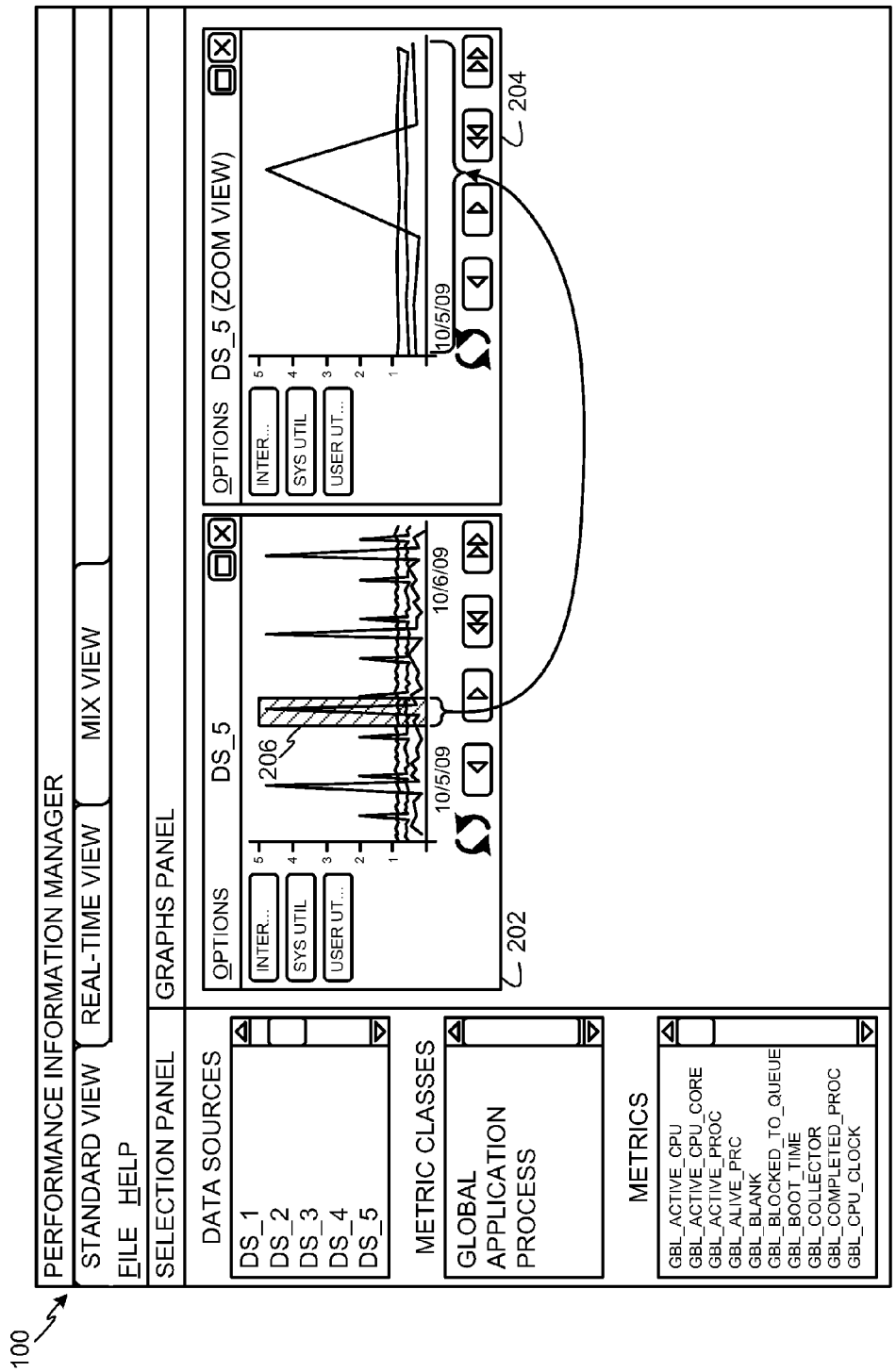
FIG. 2 depicts the example graphical user interface of FIG. 1 having a reference graph view and a magnification graph view of data sets in graphical representation shown thereon.

FIG. 2 depicts the example graphical user interface 100 of FIG. 1 having a reference graph view 202 and a magnification graph view 204 showing graphical representations of the same data sets at different time scales with finer granularity of data (if available) within the magnification graph view 204. In the illustrated example, when a user selects a user-selection time-range portion 206 of one or more data plots corresponding to one or more metrics data sets represented in the reference graph window 202, a graphical representation corresponding to the selected portion is shown in magnification in the magnification graph view 204. The time-scale of the magnification graph view 204 corresponds to the time span selected in the user-selection time-range portion 206 of the reference graph view 202. In the illustrated example, the time-scales are based on days of a month but may instead be based on other time periods.

In the illustrated example, the user may drag the user-selection time-range portion 206 along the reference graph window 202 backwards or forwards in time to display different portions of the represented data sets in magnification in the magnification graph view 204. In addition, the user may change the size of the user-selected portion 206 (e.g., by using a point and click user-interface device such as a mouse to drag, slide, or otherwise move one or more borders of the user-selected portion 206) to change the time scale of the magnification graph view 204 to show more detail or less detail of the represented data sets.

Figure 3:
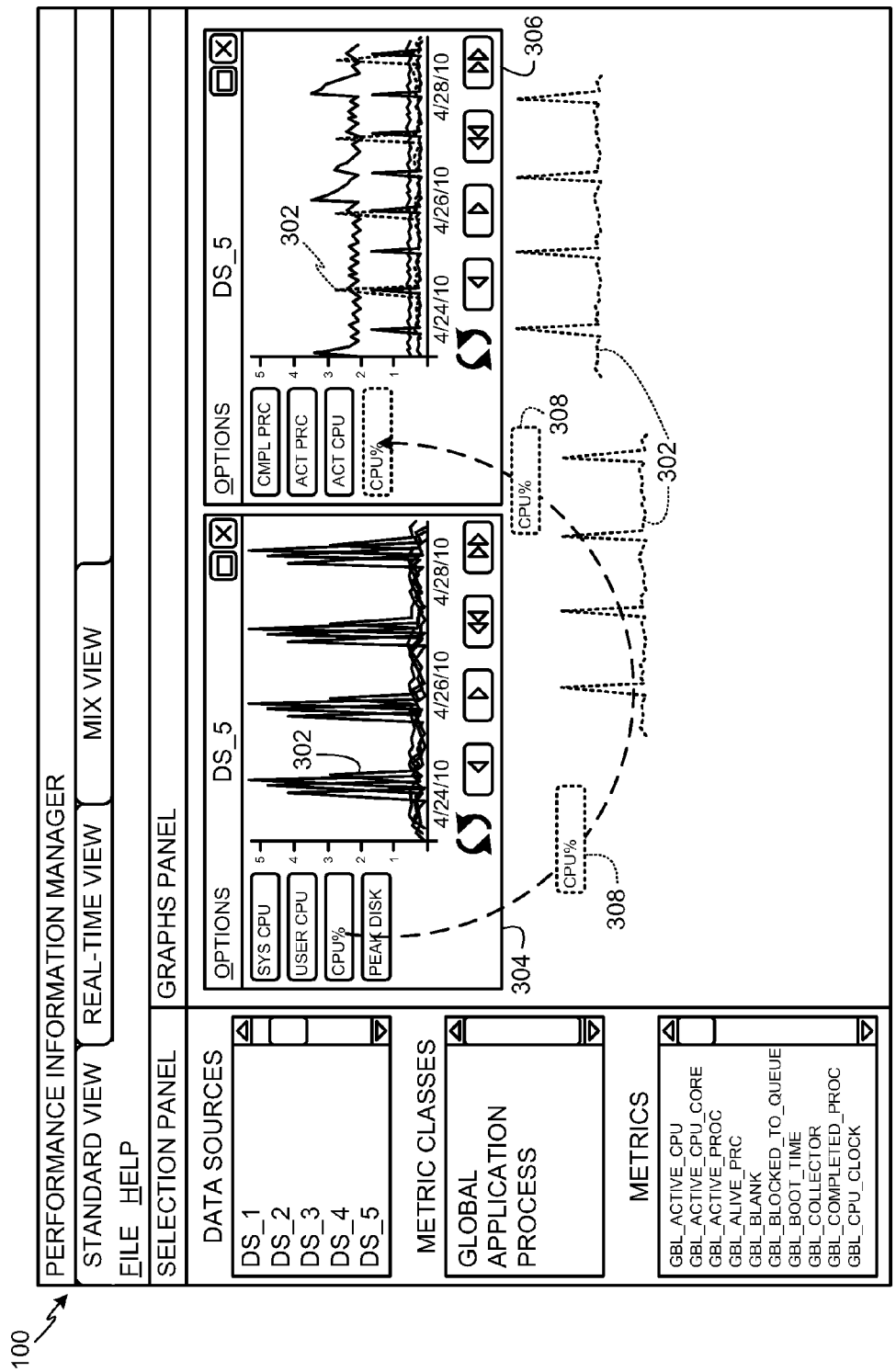
FIG. 3 depicts the example graphical user interface of FIG. 1 showing a user-controlled movement of a data set plot between different graph views.

FIG. 3 depicts the example graphical user interface 100 of FIG. 1 showing a user-controlled movement of a data set plot 302 between different graph views 304 and 306. In the illustrated example of FIG. 3, the graph views 304 and 306 display graphical representations of respective metrics data sets. To relatively compare a metric data set represented in the graph view 304 to one or more metric data sets represented in the graph view 306, a user can select a data set identifier 308 of a desired metric data set in the graph view 304 and move or drag the data set identifier 308 to the graph view 306. In response to a resulting user-interface drag event of the data set identifier 308, the graphical user interface 100 moves the data set identifier 308 and the corresponding data set plot 302 to the graph view 306 and displays the data set plot 302 relative to the other data set plots already graphically represented in the graph view 306 based on the same time scale and same time range as the graph view 306. Such movements of data set plots between different graph views facilitate comparative analysis between different performance metrics. Although one data set identifier 308 is shown as being moved in FIG. 3, different numbers and/or types of data sets may be moved to graph view 306 and/or removed from graph view 306.

Figure 4:
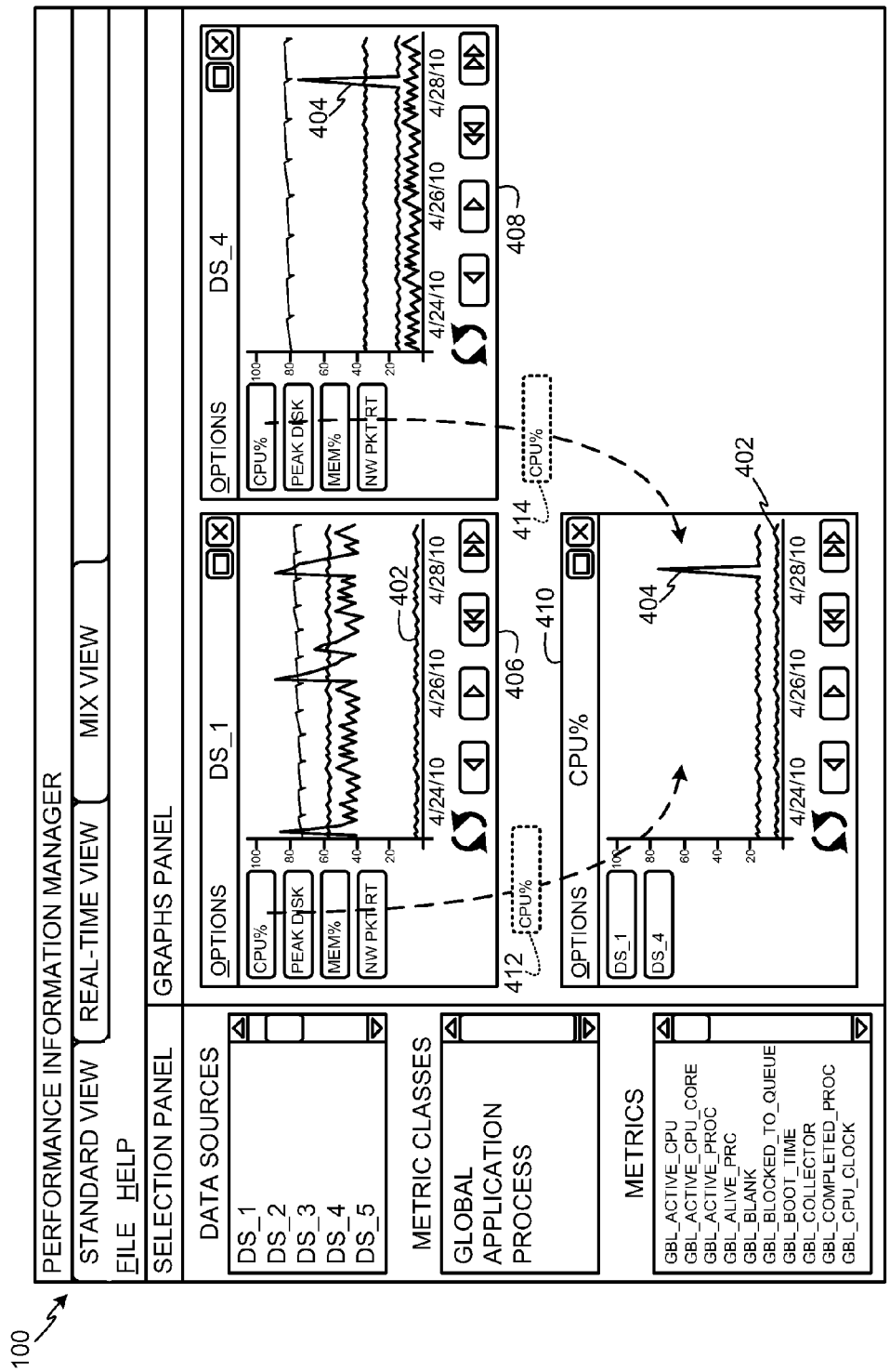
FIG. 4 depicts the example graphical user interface of FIG. 1 showing a user-controlled combination of data set plots from respective graph views into a joint graph view.

FIG. 4 depicts the example graphical user interface 100 of FIG. 1 showing a user-controlled combination of data set plots 402 and 404 from respective graph views 406 and 408 into a joint graph view 410. In the illustrated example, when a user desires to compare data set plots (e.g., the data set plots 402 and 404) from different data sources for the same performance metric (e.g., a CPU % utilization performance metric), the user may select the data set identifiers 412 and 414 for respective ones of the data set plots 402 and 404 and move or drag the data set identifiers 412 and 414 to the joint graph view 410. In the illustrated example, user-interface drag events resulting from the user's user interface actions cause the graphical user interface 100 to move the data set identifiers 412 and 414 and the corresponding data set plots 402 and 404 from the respective graph views 406 and 408 and into the joint graph view 410, in which the data set plots 402 and 404 are displayed relative to one another. In addition, a title 416 of the joint graph view 410 is representative of the performance metric (e.g., CPU %) represented in the joint graph view 410. In some example implementations, data set plots corresponding to different types of performance metrics (e.g., a CPU % utilization performance metric and an active processes performance metric) may be displayed in combination on the same graph view (e.g., the joint graph view 410).

Figure 5:
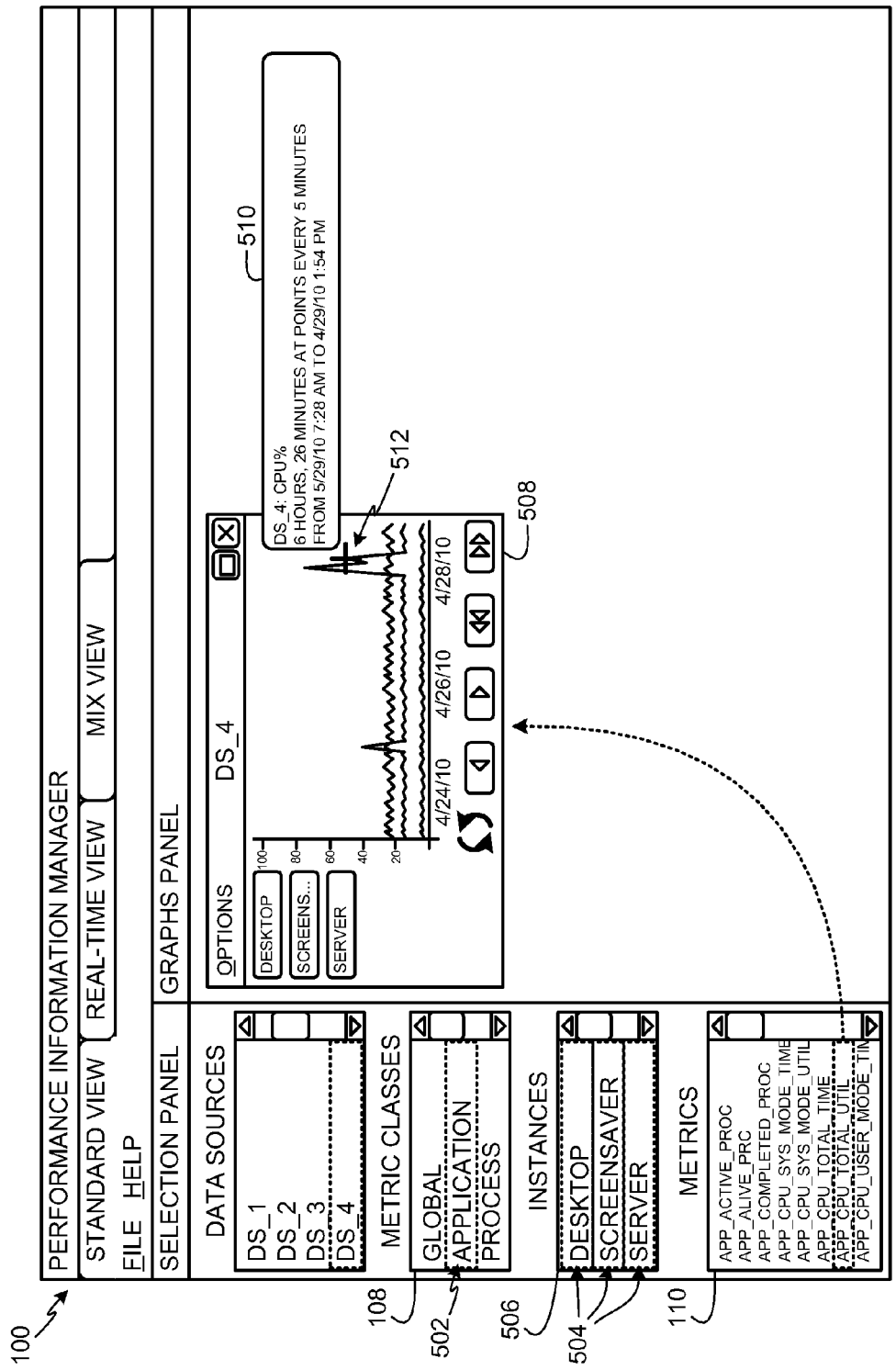
FIG. 5 depicts the example graphical user interface of FIG. 1 having data sets of the same type of metric class in graphical representation for different application instances.

FIG. 5 depicts the example graphical user interface 100 of FIG. 1 having data sets of the same type of metric class 502 (e.g., an application metric class) in graphical representation for different application instances 504. In other example implementations, other types of instances (e.g., individual CPU instances such as cpu0, cpu1, etc. of a CPU class) can be used instead of or in addition to the application instances 504. In the illustrated example, if a user desires to analyze the same performance metric for different instances of a particular metric class, the user can select the metric class type in the metric classes box 108, select multiple class instances in an instances box 506, and select a data set identifier from the metric data sets box 110 for the desired performance metric (e.g., CPU % utilization). In response, the graphical user interface 100 displays data set plots in a graph view 508 corresponding to the data sets of the desired performance metric associated with the selected class instances 504 in the instances box 506. In the illustrated example, the instances box 506 shows application class instances including a desktop application instance, a screensaver application instance, and a server application instance. A desktop application instance is representative of a particular desktop application (e.g., a local software program) that is running on a particular computer. A screensaver application instance is representative of a screensaver application that is running on a particular computer. A server application instance is representative of a particular server that is running on a particular computer. Any other class instances may additionally or alternatively be shown in the instances box 506.

In the illustrated example of FIG. 5, each of the class instances 504 of the instances box 506 is associated with respective collected performance metrics data. The collected performance metrics data are identified by metrics data set identifiers in the metric data set box 110. As shown in FIG. 5, the data set identifiers in the metric data set box 110 include APP_ACTIVE_PROC (quantity of active processes for a corresponding application instance), APP_ALIVE_PRC (quantity of alive processes for a corresponding application instance), APP_COMPLETED_PROC (quantity of completed processes for a corresponding application instance), APP_CPU_SYS_MODE_TIME (percentage of time that a processor spent in system mode for a corresponding application instance), APP_CPU_SYS_MODE_UTIL (percentage of processor resources used in system mode for a corresponding application instance), APP_CPU_TOTAL_TIME (percentage of time that a processor is used for a corresponding application instance), APP_CPU_TOTAL_UTIL (percentage of processor resources used for a corresponding application instance), and APP_CPU_USER_MODE_TIME (percentage of time that a processor spent in user mode for a corresponding application instance).

In the illustrated example, each of the class instances 504 (e.g., the desktop instance, the screensaver instance, and the server instance) has a corresponding collected performance metric data set for each of the data set identifiers in the metric data set box 110. Thus, if a user selects all of the class instances 504 in the instances box 506 and also selects the APP_CPU_TOTAL_UTL data set identifier in the metric data set box 110, the graph view 508 displays three data set plots for the selected APP_CPU_TOTAL_UTL data set identifier, each of the three data set plots corresponding to a respective one of the class instances 504 selected in the instances box 506.

As shown in the illustrated example of FIG. 5, the graphical user interface 100 may also display detailed information 510 for data set plots displayed in graph views. For example, in response to a user hovering a graphical user interface pointer 512 over a desired data set plot, the graphical user interface 100 may display the detailed information 510 in a text box overlaid on the graphs panel area 104. In the illustrated example, the detailed information 510 includes the name of the data source (e.g., DS_4), the performance metric (e.g., CPU %), the duration (e.g., 6 hours, 26 minutes) for which data was collected and the sampling rate (e.g., every 5 minutes), and the calendar date/time range (e.g., FROM Mar. 29, 2010 7:28 AM TO Apr. 29, 2010 1:54 PM) during which the data was collected.

Figure 6:
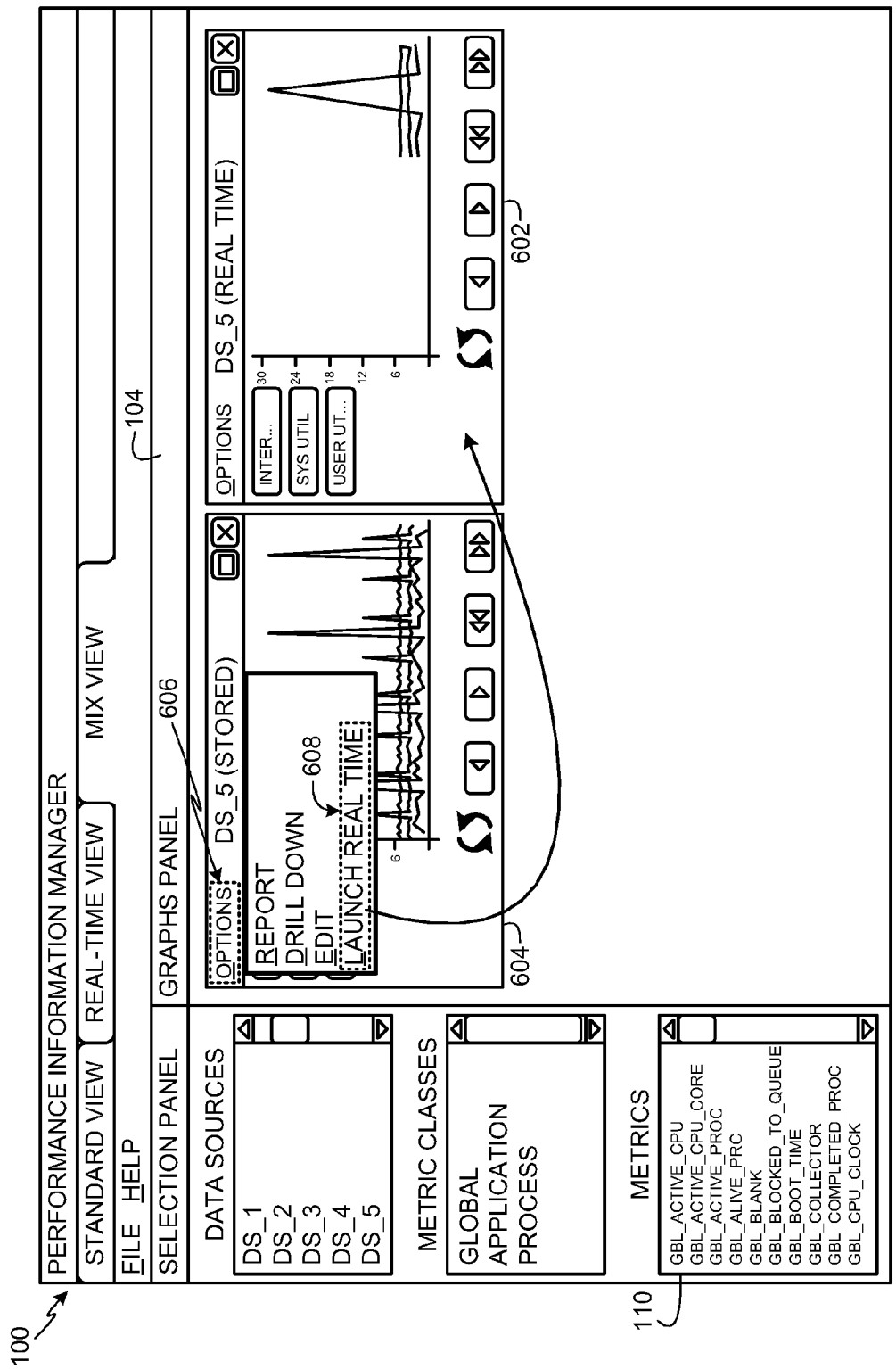
FIG. 6 depicts the example graphical user interface of FIG. 1 showing a real time data graph view launched from a stored data graph view.

FIG. 6 depicts the example graphical user interface 100 of FIG. 1 showing a real time data graph view 602 launched from a stored data graph view 604. In the illustrated example, the stored data graph view 604 displays graphical representations of previously collected (or historical) data sets and the real time data graph view 602 displays graphical representations of real time performance metric data. That is, the real time data graph view 602 shows real-time versions of the data sets represented in the stored data graph view 604.

In the illustrated example, after the graphical user interface 100 displays data set plots in the stored data graph view 604, a user may invoke an options menu 606 and select a LAUNCH REAL TIME menu command 608. In response to the user selection of the LAUNCH REAL TIME menu command 608, the graphical user interface 100 launches and displays the real time data graph view 602 and displays real time data plots related to the metric data sets graphically represented in the stored data graph view 604. Additionally or alternatively, a user may invoke the graphing of real time data plots by selecting one or more data sources (e.g., in the metric data sets box 110) that correspond(s) to an RTM data source and, for example, dragging them into the graphs panel area 104 or onto an existing graph view.

In some example implementations, the options menu 606 may display a LAUNCH NEAR-REAL-TIME menu command (not shown) instead of or in addition to the LAUNCH REAL TIME menu command 608 to enable users to request near-real-time graph views (not shown) in addition to or instead of the real time data graph view 602. In addition, an RTM data set plot may be moved to a graph view displaying a near-real-time data set plot, in which case, the RTM data set plot is displayed as near-real-time data based on a time scale, time range, and time delay associated with the already displayed near-real-time data set plot. Alternatively, a near-real-time data set plot may be moved to a graph view displaying an RTM data set plot, in which case the near-real-time data set plot is displayed as real-time data based on a time scale and time range associated with the already displayed RTM data set plot. In some example implementations, a graph view may be split horizontally or vertically into two separate graphs, one of which displays an RTM data set plot and the other one of which displays a near-real-time data set plot of the same type or different type of performance metric as the RTM data set plot.

Figure 7:
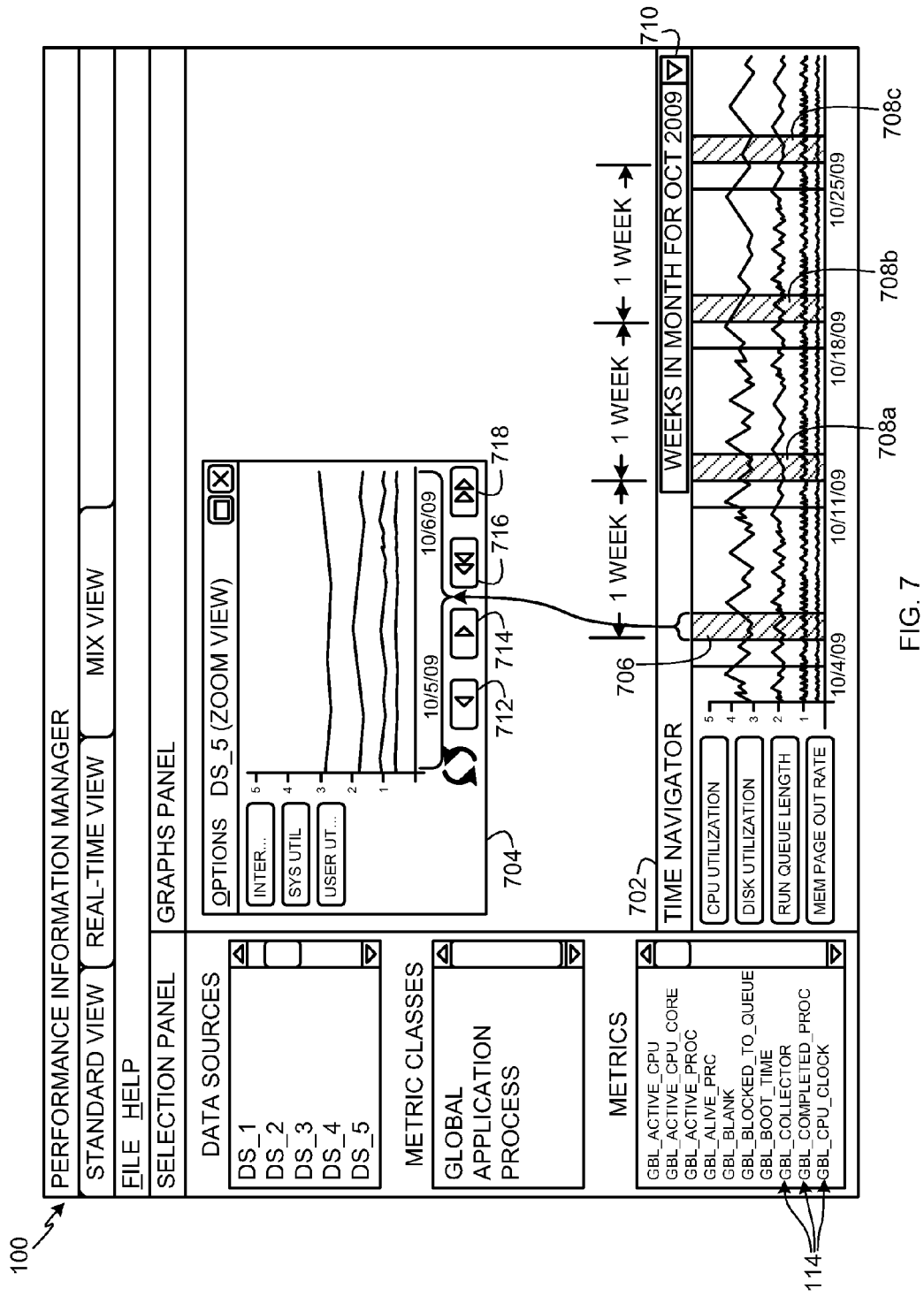
FIG. 7 depicts the example graphical user interface of FIG. 1 showing a time navigator and a magnification graph view to show portions of data sets in magnification selected in the time navigator.

FIG. 7 depicts the example graphical user interface 100 of FIG. 1 showing a time navigator 702 and a magnification graph view 704. The magnification graph view 704 shows, in magnification, portions of data set plots selected in the time navigator 702. In the illustrated example of FIG. 7, the time navigator 702 may display data set plots corresponding to different data set identifiers (e.g., the data set identifiers 114) selected by a user in the metric data sets box 110. For example, data set identifiers from the metric data sets box 110 may be dragged to the time navigator 702 to invoke the graphical user interface 100 to represent graphical representations of data sets corresponding to the selected data set identifiers.

The time navigator 702 enables users to analyze metric data sets at periodic intervals based on user-selected portions of one or more data plot(s) in the time navigator 702. For example, a user may use a user-interface cursor to select a user-selected time-range portion 706 of the data set plots displayed in the time navigator 702. The user may select the time span of the user-selected time-range portion 706 as desired to view more data or less data for each of the displayed data set plots. In response to detecting the user-selected time-range portion 706, the graphical user interface 100 may replicate time-range portions 708a-c at periodic intervals along the remainder of the displayed data set plots. In the illustrated example, each of the replicated time-range portions 708a-c has a time span equal to the time span of the user-selected time-range portion 706. Although in the illustrated example, the replicated time-range portions 708a-c are replicated at one-week intervals, they may instead be replicated based on shorter or longer periods in other example implementations. To facilitate user selection of time periods for replicated selected portions (e.g., the replicated time-range portions 708a-c), the time navigator 702 is provided with a replication period selector 710 implemented as a drop-down list control, in the illustrated example.

In the illustrated example, in response to a user creating the user-selected time-range portion 706, the graphical user interface 100 displays in the magnification graph view 704 the portions of the data set plots indicated by the user-selected time-range portion 706. In particular, the graphical user interface 100 displays the portions of the data set plots in time-scale magnification based on the user-selected time span of the user-selected time-range portion 706. In response to user-selection of or a user-click on any of the replicated time-range portions 708a-c in the time navigator 702, the graphical user interface 100 displays in the magnification graph view 704 the portions of the data set plots corresponding to a selected one of the replicated time-range portions 708a-c.

In the illustrated example, the magnification graph view 704 is provided with a backward control 712, a forward control 714, a skip backward control 716, and a skip forward control 718 to facilitate navigating along a time axis through the data set plots displayed in the magnification graph view 704. For example, a user may use the backward and forward controls 712 and 714 to navigate through the data set plots using fine granular movements through the plots. A user may use the skip backward control 716 and the skip forward control 718 to move between the different ones of the user-selected time-range portion 706 and the replicated time-range portions 708a-c without needing to advance with fine granularity through the intervening portions of the data set plots displayed in the time navigator 702.

The time navigator 702 and the magnification graph view 704 may be used in connection with previously collected performance data (e.g., historical data) and/or near-real time performance data to view, navigate through, and/or analyze performance metrics based on different time scales.

Although the example implementations of FIGS. 1-7 are depicted separately and described separately above, the example implementations and features thereof may be implemented in any combination. For example, data set identifiers from the time navigator 702 of FIG. 7 may be moved or dragged by a user into a joint graph view (e.g., the joint graph view 410) to be displayed relative to other data set plots from other graph views (e.g., the graph views 406 and 408) to facilitate comparing different data set plots associated with the same type of performance metric (e.g., CPU % utilization). Other feature described above may also be implemented in combination.

Figure 8:
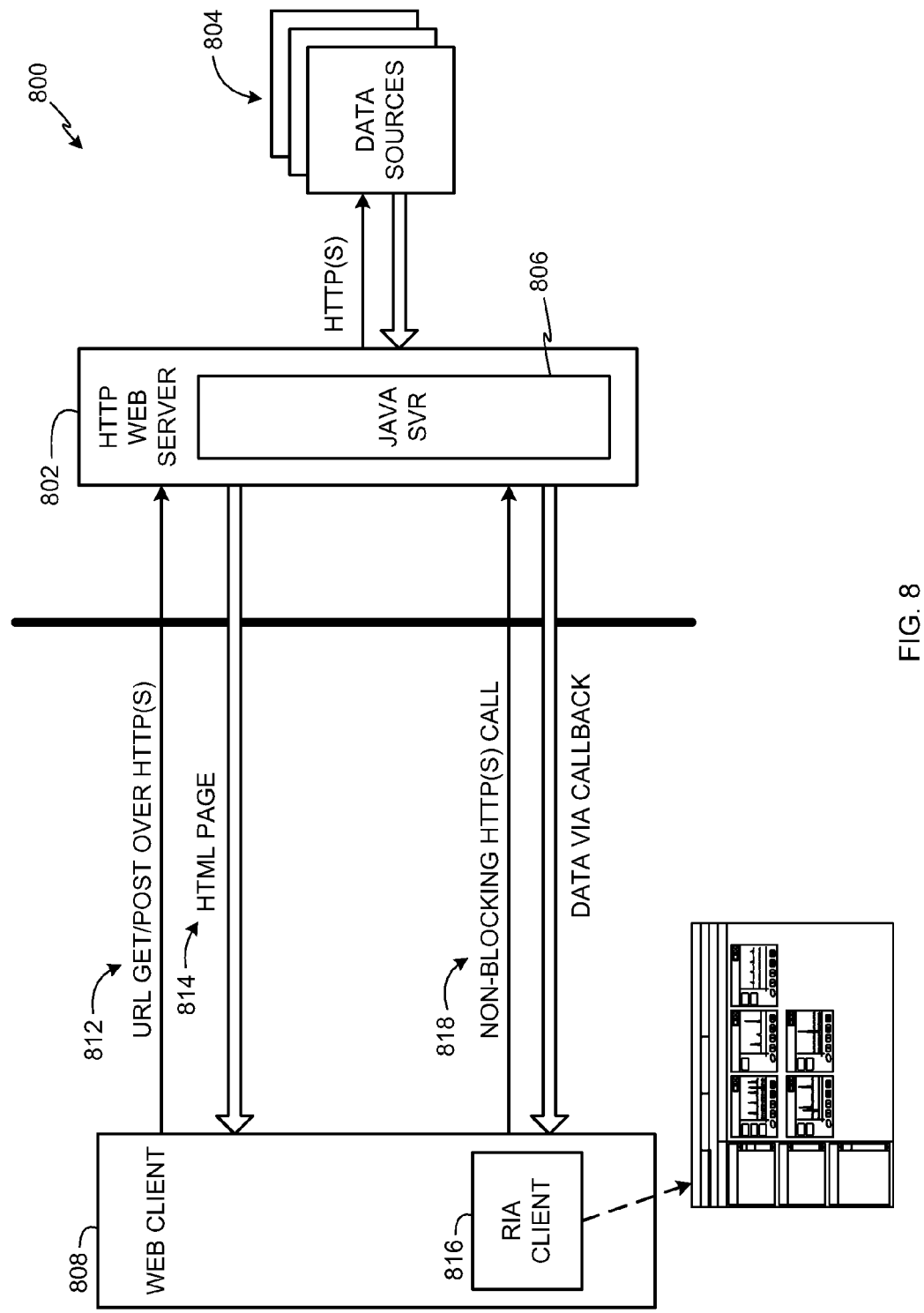
FIG. 8 depicts an example network system that may be used to access and display the performance metrics data as described above in connection with FIGS. 1-7.

FIG. 8 depicts an example network system 800 that may be used to access and display the performance metrics data as described above in connection with FIGS. 1-7. In the illustrated example, the network system 800 includes a hypertext transfer protocol (HTTP) web server 802 in communication with data sources 804. The data sources 804 correspond to data source identifiers displayed by the graphical user interface 100 in the data sources box 106 of FIG. 1. In the illustrated example, the HTTP web server 802 accesses the data sources 804 using HTTP or HTTP secure (HTTPS) calls. For real-time data, RTM data sources may create a reverse connection with the HTTP web server 802 to push real-time data using a publish/subscribe mechanism. In the illustrated example, the HTTP web server 802 is provided with a JAVA® server 806 that may be configured to serve JAVA® applets. In some example implementations, the JAVA® applets may be provided to execute the graphical user interface 100 of FIGS. 1-7. In other example implementations, the HTTP web server 802 may serve Flex or Ajax rich internet applications (RIAs) to execute the graphical user interface 100 of FIGS. 1-7.

The example network system 800 is shown as having a web client 808 in communication with the HTTP web server 802 via a network 810. In the illustrated example, the HTTP web server 802 serves one or more Flex or Ajax RIAs to the web client 808 that execute the graphical user interface 100 and supporting processes (e.g., operations, processes and functions that implement the example features of the graphical user interface 100 described above in connection with FIGS. 1-7). Alternatively, the JAVA® server 806 may serve JAVA® applets to the web client 808 including one or more JAVA® applets that execute the graphical user interface 100 and supporting processes (e.g., operations, processes and functions that implement the example features of the graphical user interface 100 described above in connection with FIGS. 1-7).

In some example implementations, each view or graph view (e.g., the graph views 112a-e of FIG. 1, the graph views 202 and 204 of FIG. 2, the graph views 304 and 306 of FIG. 3, the graph views 406, 408, and 410 of FIG. 4, the graph view 508 of FIG. 5, the graph views 602 and 604 of FIG. 6, the time navigator 702 and the graph view of 704 of FIG. 7) may be implemented using a separate JAVA® applet. In some example implementations, to achieve faster execution speeds and/or higher performance, some or all of the views and/or graph views (e.g., the graph views 112a-e of FIG. 1, the graph views 202 and 204 of FIG. 2, the graph views 304 and 306 of FIG. 3, the graph views 406, 408, and 410 of FIG. 4, the graph view 508 of FIG. 5, the graph views 602 and 604 of FIG. 6, the time navigator 702 and the graph view of 704 of FIG. 7) may be implemented using a single or the same application or applet.

During operation, the web client 808 requests the graphical user interface 100 from the HTTP web server 802 using a uniform resource locator (URL) get/post command 812 over an HTTP or HTTPS connection. In response, the HTTP web server 802 communicates an HTML web page 814 to the web client 808 to host the graphical user interface 100. In addition, the HTTP web server 802 communicates a Rich Internet Application (RIA) client 816 to the web client 808 to execute in the context of the HTML web page 814.

In the illustrated example, during operation of the graphical user interface 100 as executed by the RIA client 816, the graphical user interface 100 requests information (e.g., data sources, metric class types, metric data sets, real-time data, etc.) from the HTTP web server 802 and/or sends information thereto using non-blocking HTTP(s) calls 818.

In other example implementations, the JAVA® server 806 may be omitted from the HTTP web server 802, and the HTTP web server 802 may provide the functionality of the graphical user interface 100 to the web client 808 using other suitable technologies.

Figure 9:
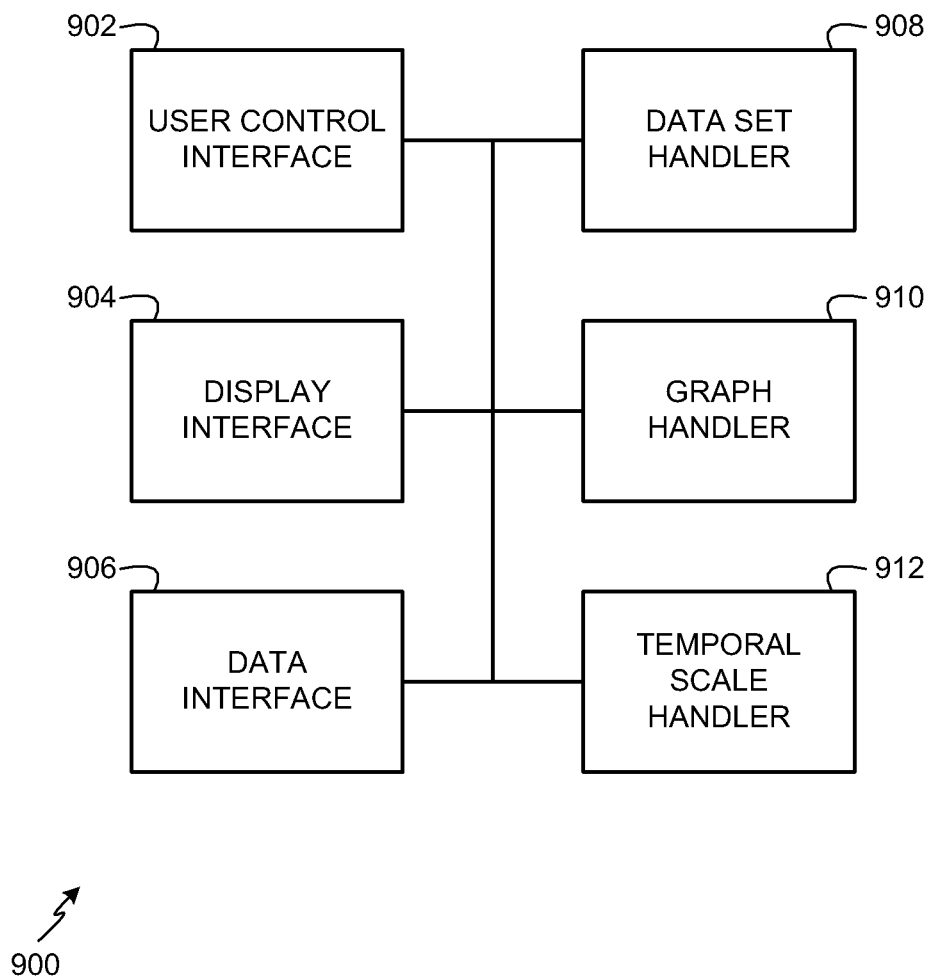
FIG. 9 depicts an example apparatus that may be used to implement the graphical user interface of FIGS. 1-7.

FIG. 9 depicts an example apparatus 900 that may be used to implement the graphical user interface 100 of FIGS. 1-7. In some example implementations, the example apparatus 900 may be used to implement a portion or all of one or more JAVA® applets that implement the graphical user interface 100. In the illustrated example, the apparatus 900 is provided with an example user control interface 902, an example display interface 904, an example data interface 906, an example data set handler 908, an example graph handler 910, and an example temporal scale handler 912. While an example manner of implementing the apparatus 900 has been illustrated in FIG. 9, one or more of the elements, processes and/or devices illustrated in FIG. 9 may be combined, divided, re-arranged, omitted, eliminated and/or implemented in any other way. Further, the user control interface 902, the display interface 904, the data interface 906, the data set handler 908, the graph handler 910, and the temporal scale handler 912 and/or, more generally, the example apparatus 900 of FIG. 9 may be implemented by hardware, software, firmware and/or any combination of hardware, software and/or firmware. Thus, for example, any of the user control interface 902, the display interface 904, the data interface 906, the data set handler 908, the graph handler 910, and the temporal scale handler 912 and/or, more generally, the example apparatus 900 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the user control interface 902, the display interface 904, the data interface 906, the data set handler 908, the graph handler 910, and/or the temporal scale handler 912 are hereby expressly defined to include a computer readable medium such as a memory, DVD, CD, etc. storing the software and/or firmware. Further still, the example apparatus 900 of FIG. 9 may include one or more elements, processes and/or devices in addition to, or instead of, those illustrated in FIG. 9, and/or may include more than one of any or all of the illustrated elements, processes and devices.

Turning in detail to FIG. 9, the apparatus 900 is provided with the user control interface 902 to receive user control input from the graphical user interface 100. Such user control input may include user selections, user-interface dragging events, data set plot additions or removals to/from graph views, selections of portions of data set plots, time-scale magnification requests, etc.

The apparatus 900 is provided with the display interface 904 to display the graphical user interface 100 on any type of display driver (e.g., a liquid crystal display (LCD) monitor, a light emitting display (LED) monitor, a cathode ray tube (CRT) monitor, etc.).

The apparatus 900 is provided with the data interface 906 to request and receive data (e.g., data source identifiers, metric class type identifiers, metric data set identifiers, metric data sets, real-time data, near-real-time data, etc.) from the HTTP web server 802 of FIG. 8.

The apparatus 900 is provided with the data set handler 908 to process metric data sets as they are displayed on the graphical user interface 100. For example, the data set handler 908 manages movements of metric data sets between different graph views (e.g., data set movements as described above in connection with FIGS. 3 and 4). The data set handler 908 also manages extracting portions of data sets for display in magnification view (e.g., magnification views as described above in connection with FIGS. 2 and 7).

The apparatus 900 is provided with the graph handler 910 to generate graph views (e.g., the graph views 112a-e of FIG. 1, the graph views 202 and 204 of FIG. 2, the graph views 304 and 306 of FIG. 3, the graph views 406, 408, and 410 of FIG. 4, the graph view 508 of FIG. 5, the graph views 602 and 604 of FIG. 6, the time navigator 702 and the graph view of 704 of FIG. 7) and combine graphical representations of different metric data sets in graph views.

The apparatus 900 is provided with the temporal scale handler 912 to manage time-scale adjustments for magnification views (e.g., magnification views as described above in connection with FIGS. 2 and 7). For example, upon receipt of a user selection of a portion of a data set plot (e.g., the user-selection time-range portion 206 of FIG. 2) the temporal scale handler 912 can determine the time span corresponding to the user selection and generate a time-scale for display in a magnification graph view (e.g., the magnification graph view 204 of FIG. 2). The temporal scale handler 912 can operate in a similar manner in connection with selections of data set plots in the time navigator 702 of FIG. 7.

FIGS. 10A-10D depict a flow diagram representative of example machine readable instructions for implementing the example apparatus 900 of FIG. 9. In this example, the machine readable instructions comprise a program for execution by a processor such as the processor 1112 shown in the example computer 1100 discussed below in connection with FIG. 11. The program may be embodied in software stored on a computer readable medium such as a CD-ROM, a floppy disk, a hard drive, a digital versatile disk (DVD), or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 10A-10D, many other methods of implementing the example apparatus 900 may alternatively be used. For example, the order of execution of the blocks may be changed, and/or some of the blocks described may be changed, eliminated, or combined.

As mentioned above, the example process of FIGS. 10A-10D may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 10A-10D may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 10A:
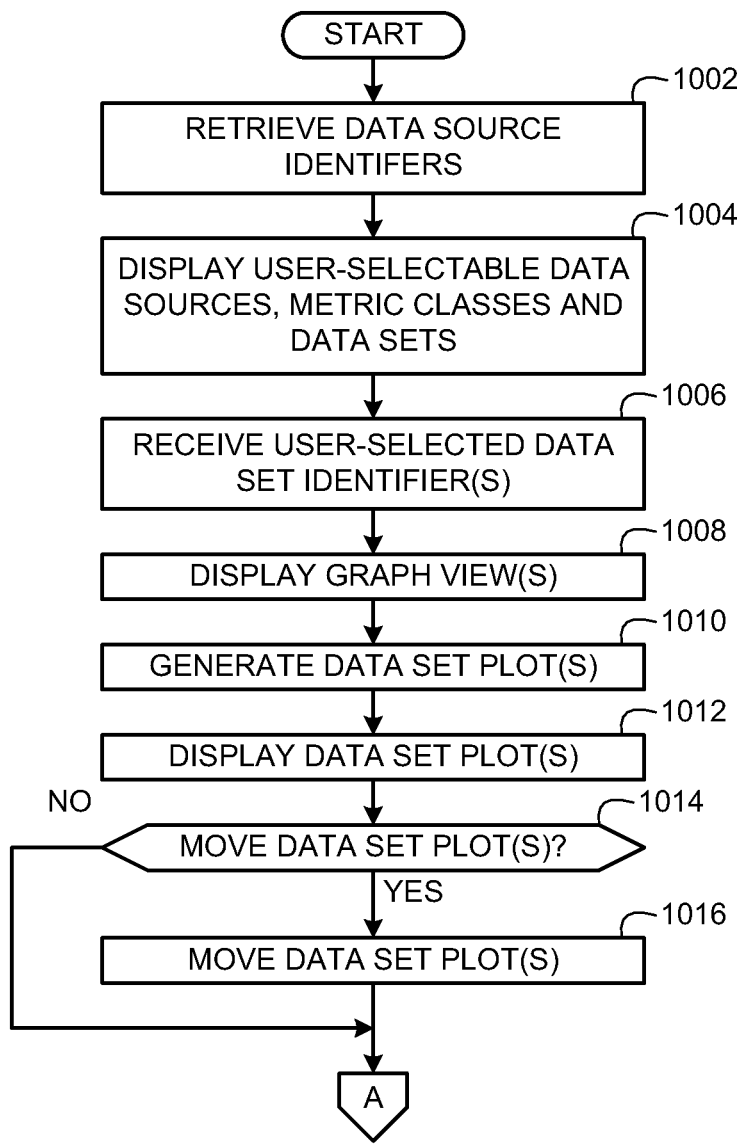
FIGS. 10A-10D depict a flow diagram representative of example machine readable instructions for implementing the example apparatus of FIG. 9.

Now turning in detail to FIG. 10A, initially, the data interface 906 (FIG. 9) retrieves data source identifiers (block 1002) from, for example, the data sources 804 (FIG. 8). The display interface 904 (FIG. 9) displays user-selectable data source identifiers, metric class identifiers, and data set identifiers (block 1004) in, for example, respective ones of the data sources box 106, the metric classes box 108, and the metric data sets box 110 of FIG. 1. The user control interface 902 (FIG. 9) receives one or more user-selected data identifier(s) (e.g., the data set identifiers 114 of FIG. 1) (block 1006).

The display interface 904 displays one or more graph views (e.g., the graph views 112a-e of FIG. 1) (block 1008) for use in displaying graphical representations of one or more data sets corresponding to the one or more data set identifier(s) received at block 1006. The graph handler 910 (FIG. 9) generates one or more data set plot(s) (block 1010) based on one or more data sets corresponding to the one or more data set identifier(s) received at block 1006. The display interface 904 displays the one or more data set plot(s) (block 1012) in the one or more graph views displayed at block 1008. The operations of blocks 1006, 1008, 1010, and 1012 may be performed to display data set plots from different data sources in respective graph views such as the graph views 112a-e of FIG. 1 or combine data set plots from different data sources into a single graph view such as the joint graph view 410 as described above in connection with FIG. 4.

The user control interface 902 determines whether a user has requested that one or more data set plot(s) be moved between different graph views (block 1014). For example, a user may select one or more data set plot(s) for moving between different graph views as described above in connection with FIGS. 3 and 4. If a user has requested that one or more data set plot(s) be moved (block 1014), the graph handler 910 moves the selected one or more data set plot(s) between the indicated graph views (block 1016).

Figure 10B:
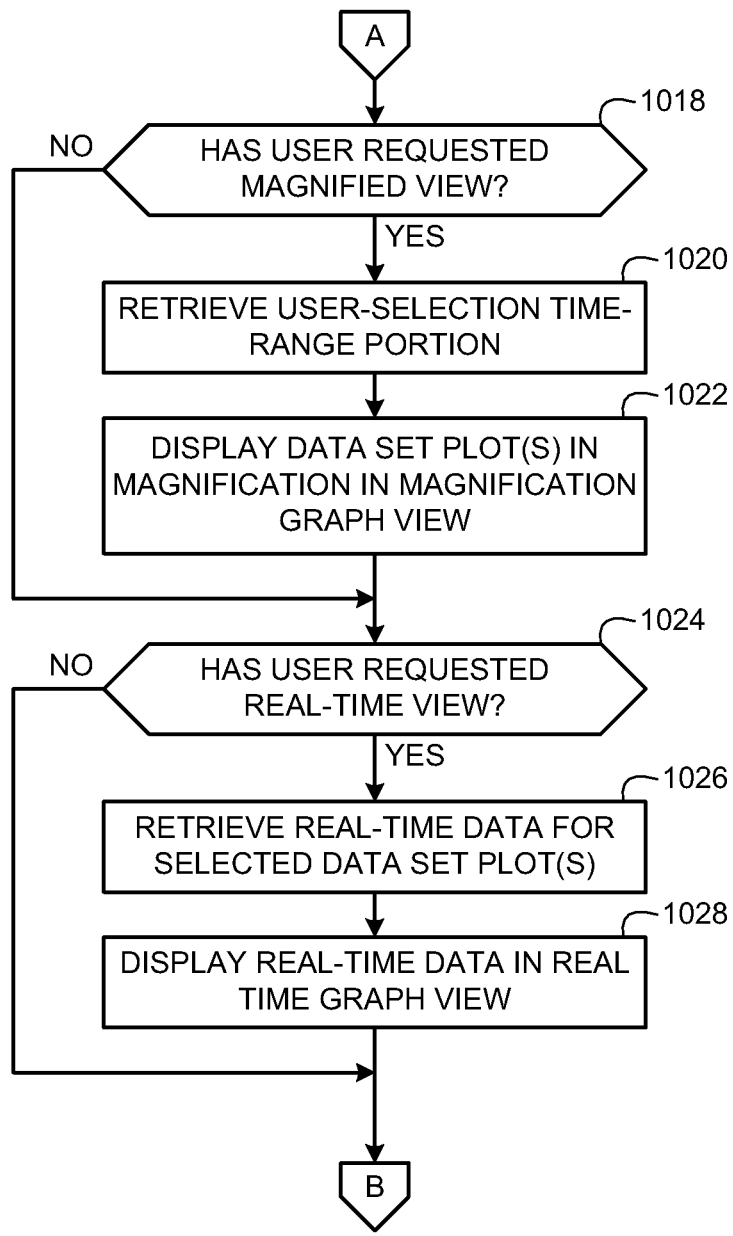

After moving the data set plot(s) at block 1016 or if the user control interface 902 determines that the user has not requested movement of any data set plot(s) (block 1014), the user control interface 902 determines whether a user has requested a magnified view of one or more data set plot(s) (block 1018) (FIG. 10B). For example, the user may request a magnified view of one or more data set plot(s) as described above in connection with FIG. 2. If the user has requested a magnified view of one or more data set plot(s) (block 1018), the user control interface 902 retrieves a user-selection time-range portion (e.g., the user-selection time-range portion 206 of FIG. 2) (block 1020). The user-selection time-range portion 206 specifies the time-scale and resolution of performance data to be shown in a magnification graph view (e.g., the magnification graph view 204 of FIG. 2). The display interface 904 displays one or more data set plot(s) selected from the user-selection time-range portion 206 in the magnification graph view 204 (block 1022).

After the display interface 904 displays one or more data set plot(s) in the magnification graph view 204 (block 1022) or if the user control interface 902 determines that a user has not requested a magnified view of one or more data set plot(s) (block 1018), the user control interface 902 determines whether the user has requested a real-time view (block 1024). For example, the user may request a real-time view as described above in connection with FIG. 6. If the user has requested a real-time view (block 1024), the data interface 906 retrieves real-time data for one or more data set plot(s) (block 1026). For example, the data set plot(s) may correspond to the same metric(s) as one or more data set plot(s) (e.g., the data set plots displayed in the stored data graph view 604 of FIG. 6) selected by a user. The display interface 904 displays the real-time data in a real-time graph view (e.g., the real time data graph view 602 of FIG. 6) (block 1028).

Figure 10C:
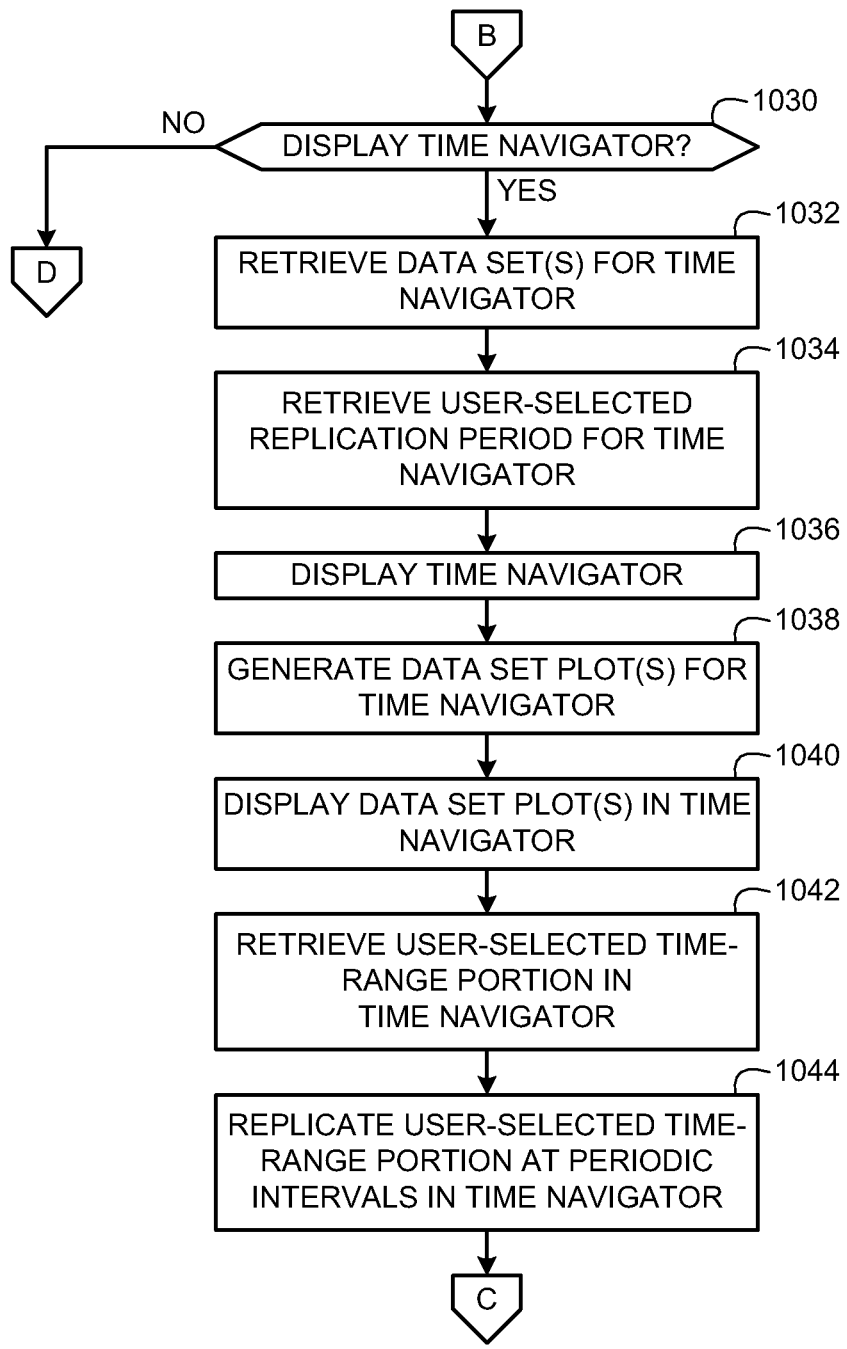

After the display interface 904 displays the real-time data in a real-time graph view (block 1028) or if the user control interface 902 determines that the user has not requested a real-time view (block 1024), the user control interface 902 determines whether a user has requested that the time navigator 702 (FIG. 7) be displayed (block 1030) (FIG. 10C). For example, a user may select a TIME NAVIGATOR menu command (not shown) in the graphical user interface 100 indicating that the user desires to view the time navigator 702. If the user control interface 902 determines that the user has requested display of the time navigator 702 (block 1030), the data interface 906 retrieves one or more data set(s) for displaying in the time navigator 702 (block 1032). Such one or more data set(s) may be specified or indicated by a user by selecting one or more metric data set identifiers (e.g., the metric data set identifiers 114 of FIG. 1) in the metric data sets box 110 of FIG. 1.

The user control interface 902 retrieves a user-selected replication period for the time navigator 702 (block 1034). For example, the user control interface 902 may select a user-selected replication period from the replication period selector 710 (FIG. 7) and use the retrieved replication period to determine the time scale with which to display data set plots in the time navigator 702. For example, if the user-selected replication period is 'weeks-per-month', one month of data can be displayed in the time navigator 702, whereas if the user-selected replication period is 'months-per-year', one year of data can be displayed in the time navigator 702.

The display interface 904 displays the time navigator 702 (block 1036). The graph handler 910 generates one or more data set plot(s) (block 1038), and the display interface 904 displays the one or more data set plot(s) in the time navigator 702 (block 1040). The user control interface 902 retrieves a user-selected time-range portion (e.g., the user-selected time-range portion 706 of FIG. 7) in the time navigator 702 (block 1042). The temporal scale handler 912 (FIG. 9) replicates the user-selected time-range portion 706 in the time navigator 702 (block 1044). For example, the temporal scale handler 912 (FIG. 9) replicates the user-selected time-range portion 706 based on the user-selected replication period retrieved at block 1034 to generate the replicated time-range portions 708*a-c* as described above in connection with FIG. 7.

Figure 10D:
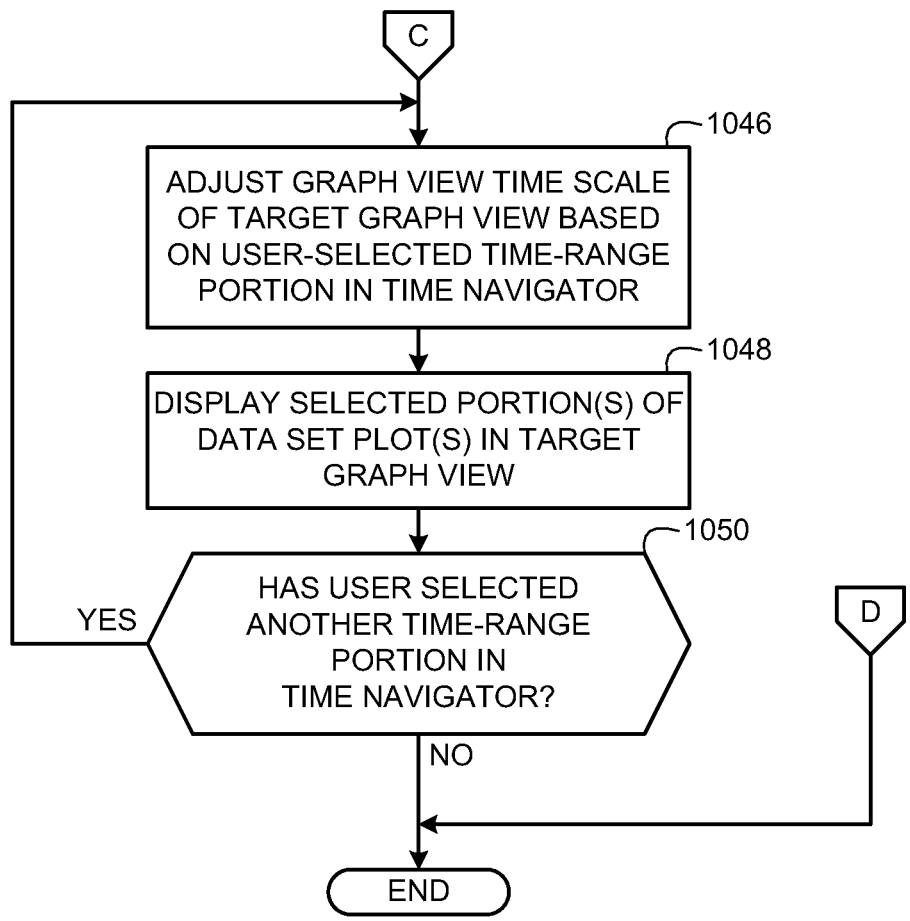

The temporal scale handler 912 adjusts a time scale of a target graph view (e.g., the magnification graph view 704 of FIG. 7) based on the time span or time range of the user-selected time-range portion 706 (block 1046) (FIG. 10D). The display interface 904 displays the selected portions (e.g., from the user-selected time-range portion 706) of one or more data set plot(s) in the target graph view (block 1048). The user control interface 902 determines whether a user has selected another time-range portion (e.g., one of the replicated time-range portions 708*a-c*) in the time navigator 702 (block 1050). For example, as described above in connection with FIG. 7, a user may click on or select any one of the user-selected time-range portion 706 and/or the replicated time-range portions 708*a-c* to display a magnification view in the magnification graph view 704 of the data set plot(s) in the selected time range portion. Alternatively, the user may use the skip backward control 716 and the skip forward control 718 to select different ones of the user-selected time-range portion 706 and/or the replicated time-range portions 708*a-c*.

If the user has selected another time-range portion (e.g., one of the replicated time-range portions 708*a-c*) (block 1050), control returns to block 1046, and the operations of blocks 1046 and 1048 are performed again to display data set plot portion(s) corresponding to the selected time-range portion. If the user has not selected another time-range portion (block 1050) or if the user control interface 902 determines at block 1030 (FIG. 10C) that the user has not requested the time navigator 702, the example process of FIGS. 10A-10D ends. Of course, the example process of FIGS. 10A-10D may repeat until a user closes the graphical user interface 100 of FIGS. 1-7.

Figure 11:
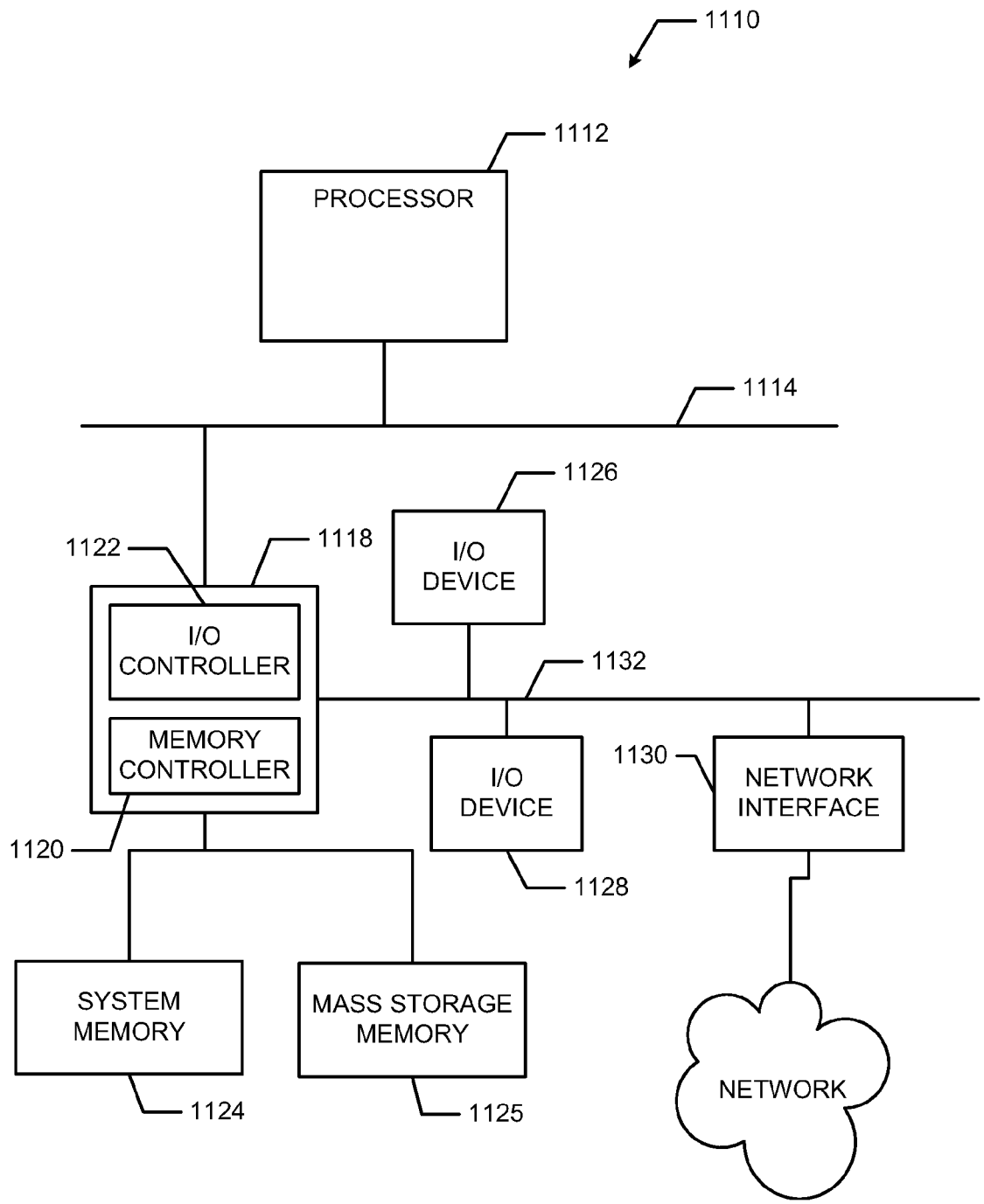
FIG. 11 is an example processor system that can be used to execute the example instructions of FIGS. 10A-10D to access and display the performance metrics data of FIGS. 1-7.

FIG. 11 is a block diagram of an example processor system 1110 that may be used to implement the example methods, apparatus, and articles of manufacture described herein. For example, a processor system substantially similar or identical to the example processor system 1110 may be used to implement the web client 808 of FIG. 8 and/or the example apparatus 900 of FIG. 9 to implement the example graphical user interface 100 and the techniques and features associated therewith as described above in connection with FIGS. 1-9 and 10A-10D.

As shown in FIG. 11, the processor system 1110 includes a processor 1112 that is coupled to an interconnection bus 1114. The processor 1112 may be any suitable processor, processing unit, or microprocessor. Although not shown in FIG. 11, the system 1110 may be a multi-processor system and, thus, may include one or more additional processors that are identical or similar to the processor 1112 and that are communicatively coupled to the interconnection bus 1114.

The processor 1112 of FIG. 11 is coupled to a chipset 1118, which includes a memory controller 1120 and an input/output (I/O) controller 1122. A chipset provides I/O and memory management functions as well as a plurality of general purpose and/or special purpose registers, timers, etc. that are accessible or used by one or more processors coupled to the chipset 1118. The memory controller 1120 performs functions that enable the processor 1112 (or processors if there are multiple processors) to access a system memory 1124 and a mass storage memory 1125.

In general, the system memory 1124 may include any desired type of volatile and/or non-volatile memory such as, for example, static random access memory (SRAM), dynamic random access memory (DRAM), flash memory, read-only memory (ROM), etc. The mass storage memory 1125 may include any desired type of mass storage device including hard disk drives, optical drives, tape storage devices, etc.

The I/O controller 1122 performs functions that enable the processor 1112 to communicate with peripheral input/output (I/O) devices 1126 and 1128 and a network interface 1130 via an I/O bus 1132. The I/O devices 1126 and 1128 may be any desired type of I/O device such as, for example, a keyboard, a video display or monitor, a mouse, etc. The network interface 1130 may be, for example, an Ethernet device, an asynchronous transfer mode (ATM) device, an 802.11 device, a digital subscriber line (DSL) modem, a cable modem, a cellular modem, etc. that enables the processor system 1110 to communicate with another processor system.

While the memory controller 1120 and the I/O controller 1122 are depicted in FIG. 11 as separate functional blocks within the chipset 1118, the functions performed by these blocks may be integrated within a single semiconductor circuit or may be implemented using two or more separate integrated circuits.

Although the above discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods, apparatus, and articles of manufacture, the examples provided are not the only way to implement such methods, apparatus, and articles of manufacture.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An apparatus to display system performance metrics, comprising:
   one or more processors to implement:
   a data interface responsive to a user selection of a first data set identifier associated with a first system performance metric to retrieve a first data set corresponding to the first data set identifier;
   a display interface to display a first plot corresponding to the first data set in a time navigator view of a graphical user interface;
   a user control interface to detect a user-selected time-range portion of the first plot in the time navigator view; and
   a temporal scale handler to generate replicated time-range portions based on the user-selected time-range portion, the display interface to display the user-selected time-range portion and the replicated time-range portions overlaid on the first plot in the time navigator view, the user-selected time-range portion and the replicated time-range portions being separated at periodic intervals relative to one another, wherein the display interface is to:
- display, in a magnification graph view, the user-selected time-range portion of the first plot, and
- display a user-selectable control in the magnification graph view to cause the magnification graph view to display the replicated time-range portions of the first plot in response to a user selecting the user-selectable control of the magnification graph view to skip to separate ones of the replicated time-range portions without displaying intervening portions of the first plot located between the periodic intervals separating the user-selected time-range portion and the replicated time-range portions.

2. The apparatus as defined in claim 1, wherein the periodic intervals are calendar-based intervals.

3. The apparatus as defined in claim 1, wherein the user control interface is to receive a user-selected interval to specify the periodic intervals.

4. The apparatus as defined in claim 1, wherein the first system performance metric is a CPU percentage utilization.

5. A method to display system performance metrics, comprising:
- in response to a user selection of a first data set identifier associated with a first system performance metric, retrieving a first data set corresponding to the first data set identifier;
- in response to a user selection of a second data set identifier associated with a second system performance metric, retrieving a second data set corresponding to the second data set identifier;
- displaying a first plot of the first data set and a second plot of the second data set in a first graph view within a graph area of a graphical user interface;
- moving the second plot of the second data set to a second graph view in the graph area of the graphical user interface based on a user selection of the second plot in the first graph view and a user-interface dragging event of the second plot to the second graph view from the first graph view;
- displaying the first and second plots in a time navigator;
- detecting a user selection of first time-range portions of the first and second plots in the time navigator;
- displaying selections of second time-range portions of the first and second plots overlaid on the first and second plots in the time navigator, the first and second time-range portions being separated at periodic intervals based on the user selection of the first time-range portions of the first and second plots;
- displaying the first time-range portions of the first and second plots in a magnification graph view separate from the time navigator based on a user selection of the first time-range portions in the time navigator; and
- displaying in the magnification graph view the second time-range portions of the first and second plots that are separated from the first time-range portions at the periodic intervals in response to a user selecting a user-selectable control of the magnification graph view to skip to separate ones of the first and second time-range portions of the first and second plots without displaying intervening portions of the first and second plots located between the periodic intervals separating the first and second time-range portions.

6. The method as defined in claim 5, wherein the displaying of the first plot and the second plot in the first graph view is performed in response to user-interface dragging events of the first data set identifier and the second data set identifier to the graph area of the graphical user interface.

7. The method as defined in claim 5, wherein the magnification graph view displays a time-scale magnification of the first and second time-range portions.

8. The method as defined in claim 5, wherein the first and second system performance metrics are a same type of metric, the first plot indicative of a performance of a first application instance, and the second plot indicative of a performance of a second application instance.

9. The method as defined in claim 5, wherein the first and second data sets include previously collected data, and further comprising updating the first and second plots in the first graph view with real-time data.

10. A tangible computer readable medium comprising instructions that, when executed, cause a computer to at least:
- in response to a user selection of a first data set identifier associated with a first system performance metric, retrieve a first data set corresponding to the first data set identifier;
- in response to a user selection of a second data set identifier associated with a second system performance metric, retrieve a second data set corresponding to the second data set identifier; and
- display a first plot of the first data set and a second plot of the second data set in a first graph view within a graph area of a graphical user interface;
- move the second plot of the second data set to a second graph view in the graph area of the graphical user interface based on a user selection of the second plot in the first graph view and a user-interface dragging event of the second plot to the second graph view from the first graph view;
- display the first and second plots in a time navigator;
- detect a user selection of first time-range portions of the first and second plots in the time navigator;
- display selections of second time-range portions of the first and second plots overlaid on the first and second plots in the time navigator, the first and second time-range portions being separated at periodic intervals based on the user selection of the first time-range portions of the first and second plots; and
- display the first time-range portions of the first and second plots in a magnification graph view separate from the time navigator based on a user selection of the first time-range portions in the time navigator; and
- display in the magnification graph view the second time-range portions of the first and second plots that are separated from the first time-range portions at the periodic intervals in response to a user selecting a user-selectable control of the magnification graph view to skip to separate ones of the first and second time-range portions of the first and second plots without displaying intervening portions of the first and second plots located between the periodic intervals separating the first and second time-range portions.

11. The tangible computer readable medium as defined in claim 10, wherein the instructions are further to cause the computer to display a second user-selectable control in the magnification graph view to display the intervening portions of the first and second plots in the magnification graph view.

12. The tangible computer readable medium as defined in claim 10, wherein the first and second data sets include previously collected data, and wherein the instructions are further to cause the computer to update the first and second plots in the first graph view with real-time data.

13. The tangible computer readable medium as defined in claim 10, wherein the instructions are to cause the computer to display the first plot and the second plot in the first graph view in response to user-interface dragging events of the first data set identifier and the second data set identifier to the graph area of the graphical user interface.

14. The apparatus as defined in claim 1, wherein the display interface is further to display a second user-selectable control in the magnification graph view to display the intervening portions of the first plot in the magnification graph view.

15. The method as defined in claim 5, further comprising displaying a second user-selectable control in the magnification graph view to display the intervening portions of the first and second plots in the magnification graph view.

* * * * *